United States Patent
Reed et al.

(10) Patent No.: US 7,143,155 B1
(45) Date of Patent: Nov. 28, 2006

(54) STANDARDIZED METHOD AND APPARATUS FOR GATHERING DEVICE IDENTIFICATION AND/OR CONFIGURATION INFORMATION VIA A PHYSICAL INTERFACE

(75) Inventors: Reginald J. Reed, Raleigh, NC (US); Fu Lee, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 840 days.

(21) Appl. No.: 09/895,434

(22) Filed: Jun. 29, 2001

(51) Int. Cl.
*G06F 15/16* (2006.01)
*G06F 11/00* (2006.01)

(52) U.S. Cl. ................. 709/223; 709/204; 709/208; 709/227; 707/10

(58) Field of Classification Search ........ 709/217–219, 709/223–225, 204, 208; 379/221.03; 370/58.2; 707/10; 714/1, 2, 37
See application file for complete search history.

(56) References Cited

U.S. PATENT DOCUMENTS

| | | | |
|---|---|---|---|
| 6,041,374 A * | 3/2000 | Postman et al. ............. 710/73 |
| 6,115,713 A * | 9/2000 | Pascucci et al. ............. 707/10 |
| 6,247,060 B1 * | 6/2001 | Boucher et al. ............ 709/238 |
| 6,334,153 B1 * | 12/2001 | Boucher et al. ............ 709/230 |
| 6,389,129 B1 * | 5/2002 | Cowan ................. 379/221.03 |
| 6,681,232 B1 * | 1/2004 | Sistanizadeh et al. .... 707/104.1 |
| 6,694,359 B1 * | 2/2004 | Morris et al. ............. 709/219 |
| 6,823,388 B1 * | 11/2004 | Philyaw et al. ............ 709/227 |

\* cited by examiner

*Primary Examiner*—David Wiley
*Assistant Examiner*—Jude J. Jean-Gilles

(74) *Attorney, Agent, or Firm*—Marger Johnson & McCollom, P.C.

(57) ABSTRACT

Described is a standard physical interface with a standardized response protocol would enable a craft or technician employee accurately and quickly to verify network devices' various identities and configurations, including relatively fixed hardware configurations and relatively rapidly changing software configurations. The apparatus for gathering network device data includes a first non-volatile memory on the network device storing defined device-specific data and being writable via the network and also readable. The apparatus further includes a physical read port on the network device including a set of one or more signals defining a physical interface and a protocol for reading the data from the first memory. Finally, the apparatus includes data-gathering means physically separate from but compatible with the read port and programmed to read the data from the first memory in accordance with the protocol, the data-gathering means including a second non-volatile memory for recording the data read from the first memory. The first memory may be partitioned to include plural storage locations for data of various types including network device identification data regarding hostname, IP address, MAC address, CLLI codes and physical device location, as well as configuration data regarding at least hardware and software revisions. The method includes providing a network device with a non-volatile memory and with an externally accessible physical data read port; programming one or more memory locations therein with data regarding the identification and configuration thereof, the one or more memory locations being readable by an external reader mechanism over the port; and providing a portable reader mechanism external to the network device but physically and logically compatible therewith for reading and recording the data from the network device.

62 Claims, 3 Drawing Sheets

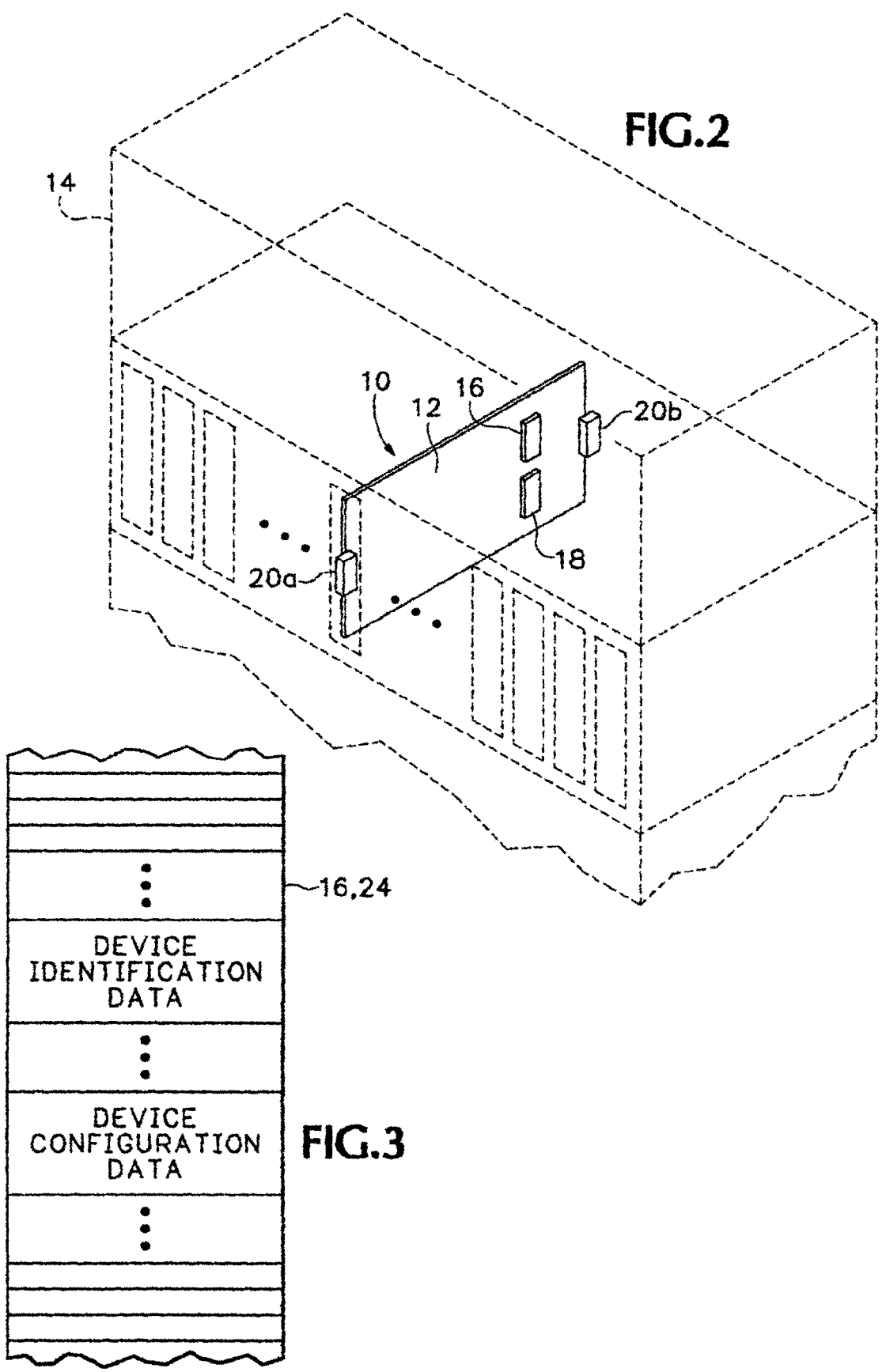

STANDARDIZED METHOD AND APPARATUS FOR GATHERING DEVICE IDENTIFICATION AND/OR CONFIGURATION INFORMATION VIA A PHYSICAL INTERFACE

BACKGROUND OF THE INVENTION

The present invention involves gathering device identification (ID) and configuration information from a device within the world-wide web (Internet). More particularly, it concerns a standardized physical interface and protocol for gathering, recording and using such information.

The identity (e.g. hostname, Internet protocol (IP) address, Medium Access Control (MAC) address, Common Language Location Identifier (CLLI) code, etc.) and configuration of any given device can change at any given point in time. Generally this information is available through some sort of network connection or console interface. The problem is that different types of devices require different commands in order to retrieve this information.

SUMMARY OF THE INVENTION

Accordingly, a standard physical interface with a standardized response protocol would enable a craft or technician employee accurately and quickly to verify network devices' various identities and configurations, including relatively fixed hardware configurations and relatively rapidly changing software configurations. The apparatus for gathering network device data includes a first non-volatile memory on the network device storing defined device-specific data and being writable via the network and also readable. The apparatus further includes a physical read port on the network device including a set of one or more signals defining a physical interface and a protocol for reading the data from the first memory. Finally, the apparatus includes data-gathering means physically separate from but compatible with the read port and programmed to read the data from the first memory in accordance with the protocol, the data-gathering means including a second non-volatile memory for recording the data read from the first memory. The first memory may be partitioned to include plural storage locations for data of various types including network device identification data regarding hostname, IP address, MAC address, CLLI codes and physical device location, as well as configuration data regarding at least hardware and software revisions.

The method includes providing a network device with a non-volatile memory and with an externally accessible physical data read port; programming one or more memory locations therein with data regarding the identification and configuration thereof, the one or more memory locations being readable by an external reader mechanism over the port; and providing a portable reader mechanism external to the network device but physically and logically compatible therewith for reading and recording the data from the network device. The gathered, portable data thus recorded can be used for reporting, maintenance, quality assurance, inventory and other purposes. By making the interface an industry standard, network-wide data may be gathered, independent of the particular design or manufacture of the diverse hardware and software in which the invented method and apparatus are embedded.

BRIEF DESCRIPTION OF THE DRAWINGS

FIG. 2 is an isometric view of the apparatus in accordance with a preferred embodiment of the invention showing the Internet device mounted within a network hardware rack for physical porting with an external portable reader mechanism.

FIG. 3 is a schematic diagram illustrating the data stored within one or more memories in accordance with the invention.

DETAILED DESCRIPTION OF THE INVENTION

Figure 1:
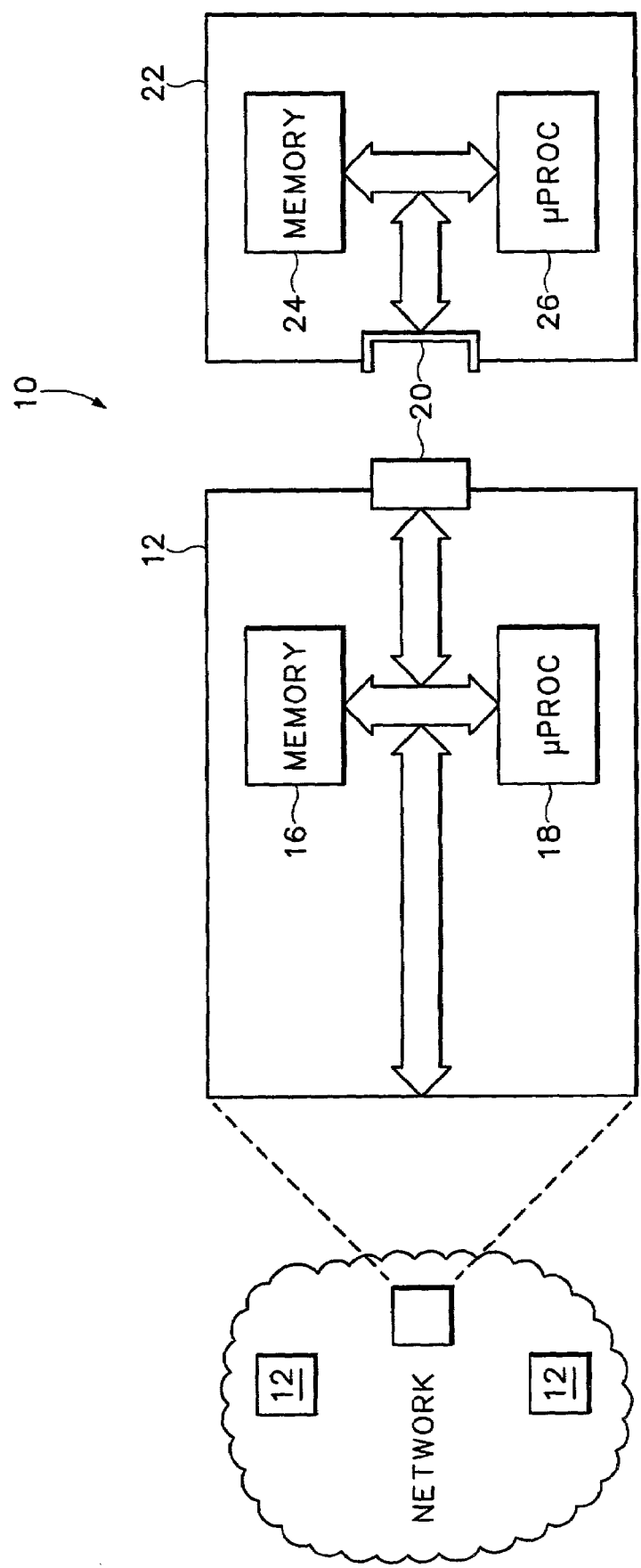
FIG. 1 is a schematic system block diagram of the invented apparatus in accordance with a preferred embodiment of the invention.

Apparatus 10 is shown schematically and physically in FIGS. 1 and 2. Apparatus 10 may be understood to take the form of a modification to an existing Internet device such as those indicated at 12 within the NETWORK cloud. Internet device 12 is installed in an Internet hardware rack 14 along with other similar or dissimilar Internet devices. Hardware rack 14 may be configured as an Internet-connected gateway, server, local area network (LAN) node, or the like. Internet device 12 may be any hardware component of such an Internet-connected device, and may be represented physically as one or more separate so-called cards. Typically, device 12 has a non-volatile first memory 16 and a microprocessor or other digital controller 18.

Apparatus 10 includes first memory 16, which stores defined device-specific data. Such device-specific data (specific to device 12) are written via the network upon network supervisor command. First memory 16 in accordance with the invention is partitioned to include plural storage locations for data of various types, including identification and configuration data, as will be seen. First memory 16 initially may be written at the time of manufacture and further may be written via supervisory command over the network. Such data are readable via a distinctive physical read port 20 on network device 12.

Physical port 20 includes a set of one or more signals defining a suitable physical interface and a suitable protocol for reading the data from first memory 16. Physically separate from, but physically and logically compatible with, physical port 20 is data-gathering means, or a portable reader mechanism, 22 for reading and recording the data from first memory 16 of Internet device 12. Data gathering means 22 may take the form of a handheld portable device including a second memory 24 and a second microprocessor or digital controller 26. Data gathering means 22 is configured, e.g. digital controller 26 is programmed, to read the data from first memory 16 in accordance with the protocol and to record the same into the second memory 24.

Those of skill in the art will appreciate that physical port 20 is made to be easily accessible to a user of portable reader mechanism 22, thereby enabling the user to gather, record, transport and use network device data specific to a given network device such as device 12. Such data as may be written into first memory 16 thus may be read therefrom by portable reader mechanism 22 and stored in portable form for further use, e.g. for inventorying an Internet installation. Such network device identification data as may be stored in first memory 16 include one or more of hostname, IP address, MAC address, one or more CLLI codes and physical device location information, e.g. rack slot number, or the like. Such network device configuration data as may be stored in first memory 16 include hardware and/or software configuration data, e.g. revision indicia such as an alphanumeric revision level for the various hardware and/or software components.

It may be seen from FIG. 2 that, in accordance with a preferred embodiment of the invention, plural instances 20a, 20b of physical port 20 may be provided in at least two distinct physical locations thereon. Such plural instances of port 20 will be understood by those of skill in the art to provide parallel (but not necessarily concurrent) access to first memory 16 for reading the (same) device-specific data therefrom. This is because alternative manufactures or installations of Internet device rack 14 may have different rack mounting configurations whereby a card, for example, may be mounted with its rearward edge or with its forward edge accessible to a user of apparatus 10, but not both. Thus, redundant instances of port 20 assure easy access independent of manufacture or installation. Those of skill in the art will appreciate that a particular network device such as a server may be embodied in one or more integral hardware devices or cards such as that shown in FIG. 2. Many such multi-card network devices already are equipped to communicate status internally, i.e. within a rack of equipment. Thus the invention is broadly applicable to gathering data from a single board (each of which may be equipped with the invented apparatus) or to a set of logically interconnected plural boards (one or more of which may be so equipped).

The MAC protocol provides the data link layer of the Ethernet local area network (LAN) system. The MAC protocol encapsulates an SDU (payload data) by adding a fourteen-byte header (protocol control information (PCI)) before the data and by appending a four-byte (thirty-two bit) cyclic redundancy check (CRC) after the data. The entire frame is preceded by a short idle period (the minimum inter-frame gap, e.g. 9.6 microseconds (9.6 µs), and an eight-byte preamble. Most of the network devices have a unique MAC address on their physical interfaces.

The Extensible Markup Language (XML) is the universal format for structured documents and data on the Internet (the world-wide network or web). The use of a standard format for data storage, retrieval and use, in accordance with a preferred embodiment of the invention, makes the interfacing of such data with other programs and users far more convenient. Thus, it is preferred that the identification and configuration data be stored in XML format in at least the first memory within the network device, and preferably also in the second memory within the portable reader mechanism. Those of skill in the art will appreciate, however, that data may be formatted for storage in memory in any suitable form, within the spirit and scope of the invention.

Physical contact with the interface would automatically signal the device to transmit identity, software configuration and hardware configuration through the physical interface. Identity would be in any suitable form and would include the current hostname and/or primary IP Address along with any associated MAC addresses, CLLI code(s) and rack position/location. Software configuration would include any or all information from the full running configuration on the device to as little as key information that is specifically tagged to be transmitted when the software configuration field is polled by the external device. Hardware configuration would include any or all vendor part numbers included in the device, along with revision or patch numbers for all field-replaceable cards and the main chassis. The physical interface would ideally be placed at multiple locations on the device (at least front and back), to facilitate easy access without regard to a particular racking convention.

Physical and logical inventory down to each individual part and chassis thus may be obtained by simply interfacing with the device via an external port. Moreover, obtaining useful information does not rely on a network connection, which may be relatively impossible due to high traffic or network gateway line, server or device problems.

Were such an interface as described herein adopted globally in the industry, all inventory could be gathered in the same fashion using the same interface.

Minimal physical access is required to determine exactly what cards or revision of cards were in a particular device. For example, as little data as device type and/or model number and/or revision letter for hardware and/software may be polled from the device. Or as much data as that and hardware and software configuration details may be determined by polling the non-volatile memory locations that contain such information. It is more beneficial, of course, to have more information than less, but even a minimalist approach to device information gathering is contemplated as a low-cost and low-impact implementation of the invention, and is within the spirit and scope thereof.

Those of skill in the art will appreciate that inventory can be performed semi-automatically without the presence of network connectivity or console interfaces. This represents a great advantage over approaches to device identification and configuration gathering method and apparatus that would require all of the various and remote hardware and software components in the network system to be fully operational and communicative.

Preferably, configuration information is maintained in a standard format, e.g. in accordance with the existing XML format. Such a standard data format allows seamless usage with existing tools for data manipulation and storage. Also preferably, flash memory (or a portion of existing flash memory or non-volatile read-and-write or random access memory (NVRAM) stores the data to be acquired. Thus, the data is maintained in a non-volatile memory that is not erased upon power down of either the network device or the external reader mechanism. Such flash/NVRAM memory in accordance with a preferred embodiment of the invention is powered by the device itself. But it will be appreciated that, alternatively and yet within the spirit and scope of the invention, DC power could be supplied over the physical interface by the external reader mechanism itself.

Also preferably, a standard hardware signal configuration, e.g. an RS-232 interface, defines the physical and handshake protocol by which network device data are read by the external reader mechanism. Such an interface is asynchronous and bit serial, thereby reducing input/output signal requirements, simplifying design, layout and access and lowering recurrent cost, e.g. material, labor and overhead (MLO).

Within the spirit and scope of the invention, however, any suitable alternative hardware interface and handshake protocol may be used. The physical connector may be modified to be of the quick-connect and quick-disconnect type, thereby facilitating data porting from the network device to the external reader mechanism. Alternatively, within the spirit and scope of the invention, the physical connector may be of custom or proprietary design. In accordance with the RS-232 interface standard, the Request-To Send (RTS)/Clear-To-Send (CTS) handshake may be used for flow control. Similarly, Data Terminal Ready (DTR) may be used to determine whether the flash memory is available (i.e. that flash memory is not in the middle of an identification data-related or a configuration data-related write process). In other words, DTR may be used to avoid memory contention and/or race conditions between maintenance (e.g. update) network operations initiated by a server and polling operations initiated by an external reader mechanism, which might otherwise inadvertently produce stale or even inaccurate identification and configuration data.

Preferably, plural instances of such a physical connector are provided, as shown in FIG. 2, e.g. adjacent two opposing peripheral edges, e.g. a forward and a rearward edge, of the network device card or box. This renders the physical port easily accessed regardless of the device's configuration within a particular network hardware rack.

A preferred general data storage format is illustrated in FIG. 3, showing that one or more of device identification and configuration data easily and efficiently may be stored in first and second memories 16, 24. One or more memory locations may be allocated to storage of identification data including one or more of the hostname, the IP address, MAC address, one or more CLLI codes and physical device location information for network device 12, as shown. Similarly, one or more memory locations may be allocated to storage of device configuration data including hardware and software configuration data, as shown. Such hardware and software configuration data may include hardware and software revision indicia, as shown. Those of skill in the art will appreciate that the allocated memory locations may be consecutive or not, and the identification and configuration memory blocks may be consecutive of not, within the spirit and scope of the invention. Finally, it is recalled that SML is the preferred storage format for all such data that is stored, whether in first memory 16 or second memory 24, although alternative form and content of memory are contemplated and are within the spirit and scope of the invention.

Figure 4:
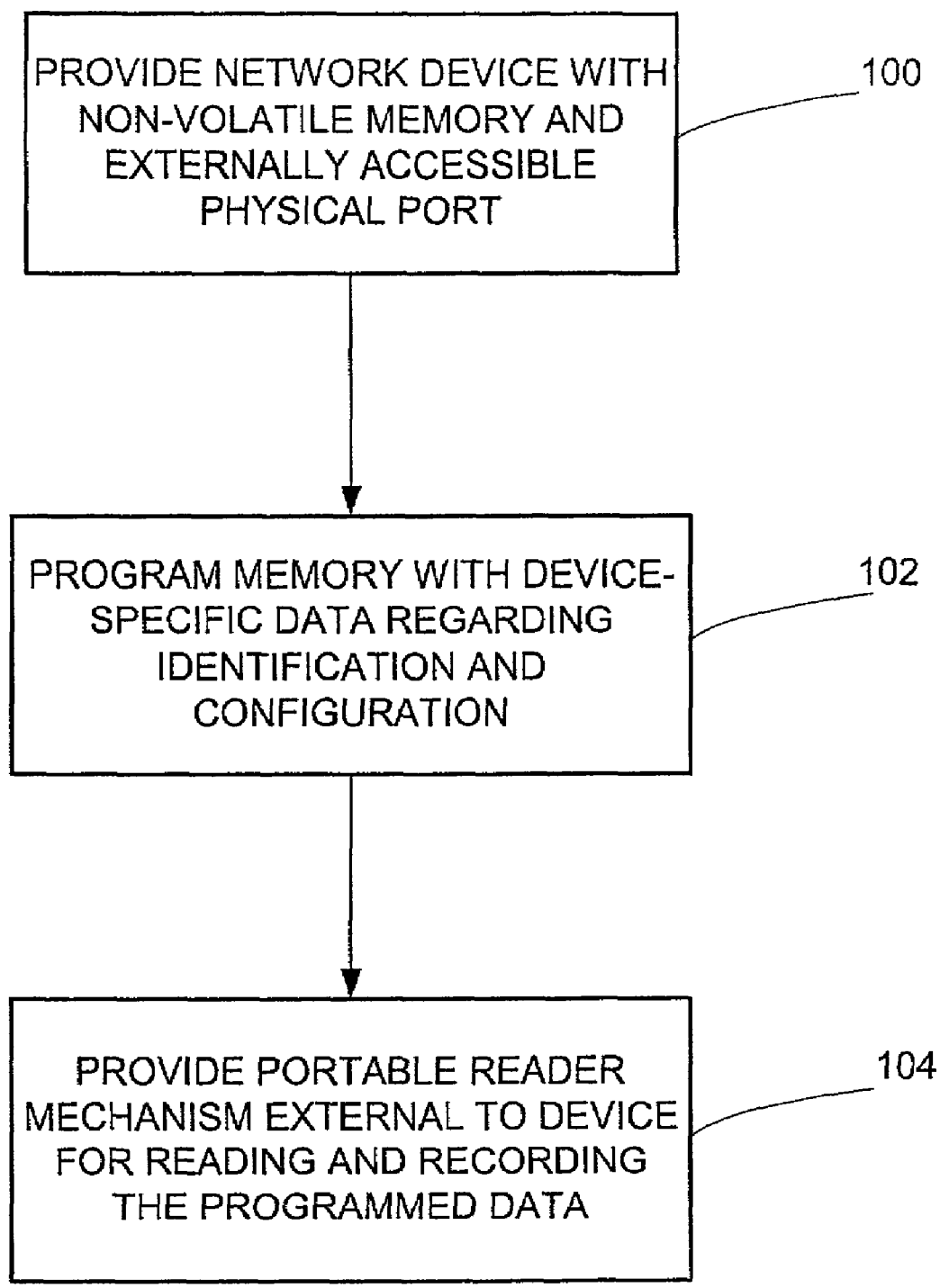
FIG. 4 is a flowchart illustrating the method in accordance with a preferred embodiment of the invention.

The method of the invention now may be understood, from the above description of the invented apparatus. Turning briefly to FIG. 4, a first invented method step 100 includes providing a network device with a non-volatile memory and with an externally accessible physical data read port thereto. Such may be accomplished by simply allocating one or more memory locations to the invented network device identification and configuration data storage task.

A second invented method step 102 includes programming one or more memory locations in the network device with data regarding the defined identification and configuration of the network device. Such may be accomplished by any suitable network-based telecommunication, e.g. a supervisory or maintenance network server at a remote or central location may simply download such network device-specific data to any or all such devices within a network. Additionally or alternatively, such network device-specific data may be programmed into the memory locations at the time of manufacture, for optional later updating via such telecommunications over the network.

A third invented method step 104 includes providing a portable reader mechanism external to the network device, but physically and logically compatible therewith, for reading and recording the programmed data from the network device. Such may be accomplished in any suitable form of the apparatus, preferably in the form of a lightweight portable reader mechanism that may be used to poll such network device-specific data from any and all such network devices.

Those of skill in the art will appreciate that the more standard the physical interface and command and read prompt protocols and data storage formats, the wider utility and facility provided under the principles of the invention. The adoption of a network-wide or industry standard physical and logical interface and porting protocol and data format is most preferable, as such permits inventory and revision control across the already vast and rapidly growing installed base of network devices and servers.

Finally, those of skill in the art will appreciate that the invented method and apparatus described and illustrated herein may be implemented in software, firmware or hardware, or any suitable combination thereof. Preferably, the method and apparatus are implemented in software, to the extent practical, for the purpose of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable processor.

Alternative embodiments are contemplated, however, and are within the spirit and scope of the invention. For example, hardware portions of the method and apparatus including the memories within the network device and the external reader mechanism, and including the physical read port and any needed interface hardware such as a cable, are also contemplated. Within the spirit and scope of the invention, however such physical interface may take any suitable form, e.g. data porting may be achieved via a wireless infrared transmission subsystem.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

The invention claimed is:

1. A system, comprising:
   a network device including a first memory to store hardware and software version numbers for the network device in a predetermined memory location;
   the network device furthering including a physical read port coupled to the first memory, said physical port including a set of one or more signals defining a physical interface and a protocol for reading said hardware and software version numbers from the predetermined memory location independently of any network protocols; and
   data-gathering circuitry physically separate from but compatible with said read port and programmed to automatically read said hardware and software version numbers from the predetermined memory location using the protocol,
   said automatic reading from the predetermined memory location further programmed to occur in response to detachably coupling the data-gathering circuitry to the network device and independently of any manual inputs over any human interface devices for either the data-gathering circuitry or the network device.

2. The system of claim 1, wherein said data-gathering circuitry further includes a second memory for recording said hardware and software version numbers, said second memory partitioned to include plural storage locations for data of various types, said types including network device identification data.

3. The system of claim 1, wherein said software version number specifies a currently loaded software version for the network device from a plurality of software versions that are compatible with the network device but not currently loaded on the network device.

4. The system of claim 1, wherein the hardware and software version numbers are transferred from the network device to the data-gathering circuitry regardless of whether the network device is accessible by any networks.

5. The system of claim 4, wherein both the data-gathering circuitry and the network device are physically decoupled from any visual displays immediately before, during and immediately after the automatic reading.

6. The system of claim 5, wherein the data-gathering circuitry is structured to detachably couple to a device having a screen and transfer the hardware and software version numbers to the device having the screen for displaying the hardware and software version numbers on the screen.

7. The system of claim 1, wherein said physical port is mounted in an accessible physical location on the network device.

8. The system of claim 7 which comprises plural instances of said physical port in at least two distinct physical locations thereon, said plural instances of said physical port providing parallel access to said first nonvolatile memory for reading the hardware and software version numbers therefrom.

9. The system of claim 8, wherein said plural instances of said physical port are at least two instances and wherein said two physical ports are physically located adjacent forward and rearward edges of the network device.

10. The system of claim 1, wherein said protocol is bit serial.

11. The system of claim 10, wherein said interface and protocol are in accordance with the RS-232 standard.

12. The system of claim 1, wherein said hardware and software revision indicia are stored in accordance with a predefined format.

13. The system of claim 12, wherein said predefined format is in accordance with the Extensible Markup Language (XML) standard.

14. A method of gathering network device data, the method comprising:
    providing a network device with a non-volatile memory and with an externally accessible physical data read port thereto,
    preconfiguring the network device with protocols necessary to cause the network device to automatically initiate communications in response to an external reader mechanism being physically coupled to the data read port;
    programming one or more predetermined memory locations in the network device with data regarding a defined identification and a defined configuration of the network device, the one or more memory locations being readable by the external reader mechanism over the data read port;
    physically coupling the external reader mechanism to the data read port; and
    automatically initiating communications in response to the physical coupling, the automatically initiated communications transferring at least a portion of said data from the network device to the external reader mechanism;
    wherein the external reader mechanism is programmed to read the data from the predetermined memory locations.

15. The method of claim 14, wherein said programming of the one or more predetermined memory locations is with data stored in a predefined format.

16. The method of claim 14 where the external reader mechanism does not have a user interface.

17. The method of claim 14, wherein the communications are in accordance with the RS-232 standard and wherein the data are stored in a predefined format.

18. The method of claim 17, wherein the predefined format in which the data are stored is in accordance with the Extensible Markup Language (XML) format.

19. A computer-readable medium containing a program for gathering network device data by an external reader mechanism from a network device, the program comprising:
    instructions residing in the network device for programming one or more memory locations in the network device with data regarding a defined identification and a defined configuration of the network device, the one or more memory locations being readable by an external reader mechanism over an externally accessible physical data read port thereto, said programming instructions being executable responsive to a write command received over a network communication line, and
    instructions residing in the network device for providing read access, of the programmed data in the one or more memory locations in the network device, to the external reader mechanism responsive to a read prompt from the external reader mechanism.

20. The computer-readable medium in accordance with claim 19, which computer readable medium further comprises:
    instructions residing in the external reader mechanism for prompting a read of the programmed data in the one or more memory locations in the network device and for storing the data read therefrom in a non-volatile memory location within the external reader mechanism.

21. The computer-readable medium in accordance with claim 20, wherein the programming of the one or more memory locations within the network device is with data stored in a predefined format and wherein the storing of the programmed data within the external reader mechanism is also in a predefined format.

22. A system, comprising:
    means for providing a network device with a non-volatile memory and with an externally accessible physical data read port thereto,
    means for preconfiguring the network device with protocols necessary to cause the network device to automatically initiate communications in response to an external reader mechanism being physically coupled to the data read port;
    means for programming one or more memory locations in the network device with data regarding a defined identification and a defined configuration of the network device, the one or more memory locations being readable by an external reader mechanism over the data read port;
    means for physically coupling the external reader mechanism to the data read port; and
    automatically initiating communications in response to the physical coupling, the automatically initiated communications transferring at least a portion of said data from the network device to the external reader mechanism;
    wherein said programming of the one or more predetermined memory locations is with data stored in a predefined format.

23. The system of claim 22 wherein the external reader mechanism is a handheld portable device that uploads the portion of said data to a personal computer independently of any Local Area Networks (LANs).

24. The system of claim 23 wherein said external reader mechanism includes a predefined physical and logical interface and means for reading and recording the portion of said data in accordance with a predefined protocol.

25. The system of claim 24 wherein the protocol is bit serial, wherein the interface and protocol are in accordance with the RS-232 standard and wherein the portion of the data is stored in a predefined format.

26. The system of claim 25 wherein the predefined format in which the portion of the data is stored is in accordance with the Extensible Markup Language (XML) format.

27. Apparatus for gathering network configuration information from a screenless network device having a physical port for exporting network configuration information stored in a memory device therein, the apparatus comprising:
- a screenless portable device;
- a memory within said screenless portable device;
- a physical port on the screenless portable device, said physical port including a set of one or more signals defining a physical interface and a protocol for reading the network configuration information from the memory device in the screenless network device, said protocol operating independently of any network protocols, and
- a processor coupled with the memory within said portable device, the processor to automatically initiate a transfer of the network configuration information from the screenless network device to said memory in said screenless portable device in response to a manual physical coupling of the screenless network device to the physical port, said automatic initiated transfer occurring independently of any manual operations besides the manual physical coupling.

28. The apparatus of claim 27, wherein said network configuration information includes one or more of a hostname, a Internet protocol (IP) address, a medium access control (MAC) address, one or more common language location identifier (CLLI) codes and physical device location information for the screenless network device.

29. The apparatus of claim 28, wherein said network configuration information further includes network device configuration data.

30. The apparatus of claim 29, wherein said network device configuration data include firmware and software configuration data.

31. The apparatus of claim 27, wherein said protocol is bit serial.

32. The apparatus of claim 31, wherein said interface and protocol are in accordance with the RS-232 standard.

33. The apparatus of claim 27, wherein said data are stored in accordance with a predefined format.

34. The apparatus of claim 33, wherein said predefined format is in accordance with the Extensible Markup Language (XML) standard.

35. A system for gathering network device data from a network device, the system comprising:
- a first non-volatile memory on the network device, said first memory storing firmware configuration data and being writable via the network and being readable;
- a physical read port on the network device, said physical port including a set of one or more signals defining a physical interface and a protocol for reading said data from said first memory; and
- a portable reader mechanism programmed to read said data from said first memory in accordance with said protocol, said portable reader mechanism including a second non-volatile memory for recording said data read from said first memory, thereby enabling a user to gather and record firmware configuration data;
- wherein said portable reader mechanism is configured so that a user can gather and record the firmware configuration data without relying on a network connection.

36. The system of claim 35, wherein said second non-volatile memory is partitioned to include plural storage locations for data of various types, said types including network device identification data.

37. The system of claim 36, wherein said network device identification data includes one or more of the hostname, the Internet protocol (IP) address, the medium access control (MAC) address, one or more common language Location Identifier (CLLI) codes and physical device location information for the network device.

38. The system of claim 36, wherein said types further include network device configuration data.

39. The system of claim 38, wherein said network device configuration data includes hardware and software configuration data.

40. The system of claim 39, wherein said hardware and software configuration data includes hardware and software revision indicia.

41. The system of claim 35, wherein said physical port of said network device is mounted in an accessible physical location.

42. The system of claim 41 further comprising a plurality of physical ports in at least two distinct physical locations thereon, said plurality of physical ports providing parallel access to said first non-volatile memory for reading the device-specific data therefrom.

43. The system of claim 42, wherein at least one of the plurality of physical ports is located on a front edge of the network device and at least a second of the plurality of physical ports is located on a rear edge of the network device.

44. The system of claim 35, wherein said protocol is bit serial.

45. The system of claim 44, wherein said interface and protocol are in accordance with the RS-232 standard.

46. The system of claim 35, wherein said data are stored in accordance with a predefined format.

47. The system of claim 46, wherein said predefined format is in accordance with the Extensible Markup Language (XML) standard.

48. A method, comprising:
- providing a network device with a non-volatile memory and with an externally accessible physical data read port thereto;
- preconfiguring the network device with protocols necessary to cause the network device to automatically initiate communications in response to an external reader mechanism being physically coupled to the data read port;
- programming one or more memory locations in the network device with data regarding a defined identification and a defined configuration of the network device, the one or more memory locations being readable by an external reader mechanism over the data read port; and
- physically coupling the external reader mechanism to the data read port; and
- automatically initiating communications in response to the physical coupling, the automatically initiated communications transferring at least a portion of said data from the network device to the external reader mechanism;

where the external reader mechanism does not have a user interface.

49. The method of claim 48, wherein said programming of the one or more memory locations is with data stored in a predefined format.

50. The method of claim 49, wherein said external reader mechanism includes a predefined physical and logical interface and wherein the automatically initiated communications are in accordance with a predefined protocol.

51. The method of claim 50, wherein the predefined protocol is bit serial, wherein the interface is in accordance with the RS-232 standard and wherein the portion of the data is stored in a predefined format.

52. The method of claim 51, wherein the predefined format in which the portion of the data is stored is in accordance with the Extensible Markup Language (XML) format.

53. A system for gathering network device data from a network device having a physical port for exporting network device-specific data stored in a memory device therein, the apparatus comprising:
- a hand held portable device;
- a non-volatile memory within said portable device;
- a processor coupled with the non-volatile memory within said portable device; and
- a physical port on the portable device, said physical port including a set of one or more signals defining a physical interface and a protocol for automatically reading data from the memory device in the network device in response to a physical coupling of the physical port and the network device, said protocol operating independently of any network protocols;
- wherein the non-volatile memory within said portable device is partitioned to include plural storage locations for data of various types, said types including network device identification data, thereby enabling a user to gather and record network device data and to transport such network device data to a remote location,
- and further wherein said hand held portable device is configured to allow said user to gather and record network device data specific to the network device without relying on a network connection.

54. The system of claim 53, wherein said network device identification data include one or more of a hostname, an Internet protocol (IP) address, a medium access control (MAC) address, one or more common language location identifier (CLLI) codes and physical device location information from the network device.

55. The system of claim 54, wherein said types further include network device configuration data.

56. The system of claim 55, wherein said network device configuration data include firmware and software configuration data.

57. The system of claim 53, wherein said protocol is bit serial.

58. The system of claim 57, wherein said interface and protocol are in accordance with the RS-232 standard.

59. The system of claim 53, wherein said data are stored in accordance with a predefined format.

60. The system of claim 59, wherein said predefined format is in accordance with the Extensible Markup Language (XML) standard.

61. A system, comprising:
- a first memory storing a Basic Input Output System (BIOS) version number that distinguishes a currently loaded BIOS version for the network device from a plurality of BIOS versions that are compatible with the network device but not currently loaded on the network device, said first memory integrated with the network device;
- a physical read port including a set of one or more signals defining a physical interface and a protocol for reading the BIOS version number from said first memory, said read port integrated with the network device and said protocol operating independently of any network protocols; and
- data-gathering circuitry physically separate from but compatible with the network device having said read port and programmed to read the BIOS version number from said first memory in accordance with said protocol, said data-gathering circuitry including a second non-volatile memory for recording the BIOS version number read from said first memory, said data gathering circuitry structured to detachably couple to the network device thereby enabling a user to gather and record the BIOS version number.

62. The system of claim 60 wherein the network device is a rack mounted server.

* * * * *